United States Patent [19]

Lee et al.

[11] Patent Number: 4,847,473
[45] Date of Patent: Jul. 11, 1989

[54] CARD VENDING MACHINE

[75] Inventors: Kenneth A. Lee, Columbus; Robert J. Palmquist, Omaha, both of Nebr.

[73] Assignee: The Children'Fund, Elkhorn, Nebr.

[21] Appl. No.: 218,970

[22] Filed: Jul. 14, 1988

[51] Int. Cl.<sup>4</sup> ............................................... G06F 7/08
[52] U.S. Cl. ..................................... 235/381; 235/375
[58] Field of Search ................................ 235/375, 381

[56] References Cited

U.S. PATENT DOCUMENTS 4,674,618 6/1987 Eglise .................................. 235/381

Primary Examiner—Harold I. Pitts
Attorney, Agent, or Firm—Zarley, McKee, Thomte, Voorhees & Sease

[57] ABSTRACT

A pickle card dispenser comprising a cabinet having a front portion adapted to display the pickle cards in a vertically disposed manner with the vertically disposed cards being in communication with a plurality of card trays provided in the cabinet. The front portion of the cabinet has a plurality of vertically disposed channels in which the cards are positioned. The cards are dispensed from the cabinet in response to money being deposited in a bill acceptor being provided therein.

3 Claims, 9 Drawing Sheets

CARD VENDING MACHINE

BACKGROUND OF THE INVENTION

This invention relates to a card vending machine and more particularly to a tab card or pickle card dispensing machine.

Tab cards or pickle cards are commonly referred to as pickles and have become extremely popular the last few years. The pickles are normally dispensed by an attendant, waitress, bartender, etc. and are simply pulled from a stack of the pickles. The primary problem associated with the commonly employed method of dispensing the pickles is that it is difficult to control the money being handled by the dispensing person.

In an effort to avoid the necessity of the need for manually dispensing the pickles, some card dispensing machines have been previously provided but they do have several shortcomings. One shortcoming of the prior art machines is that they are unable to dispense various priced pickles. Further, a disadvantage in the prior art is that the dispensing means within the dispenser is less than reliable.

Therefore, it is a principal object of the invention to provide an improved card dispensing machine.

A further object of the invention is to provide a pickle dispensing machine.

Still another object of the invention is to provide a pickle dispensing machine which has a credit register associated therewith.

Still another object of the invention is to provide a pickle dispensing machine including an improved electromechanical dispensing apparatus which is reliable.

Still another object of the invention is to provide a pickle dispensing machine which is economical of manufacture, durable in use and refined in appearance.

These and other objects will be apparent to those skilled in the art.

SUMMARY OF THE INVENTION

Figure 1:
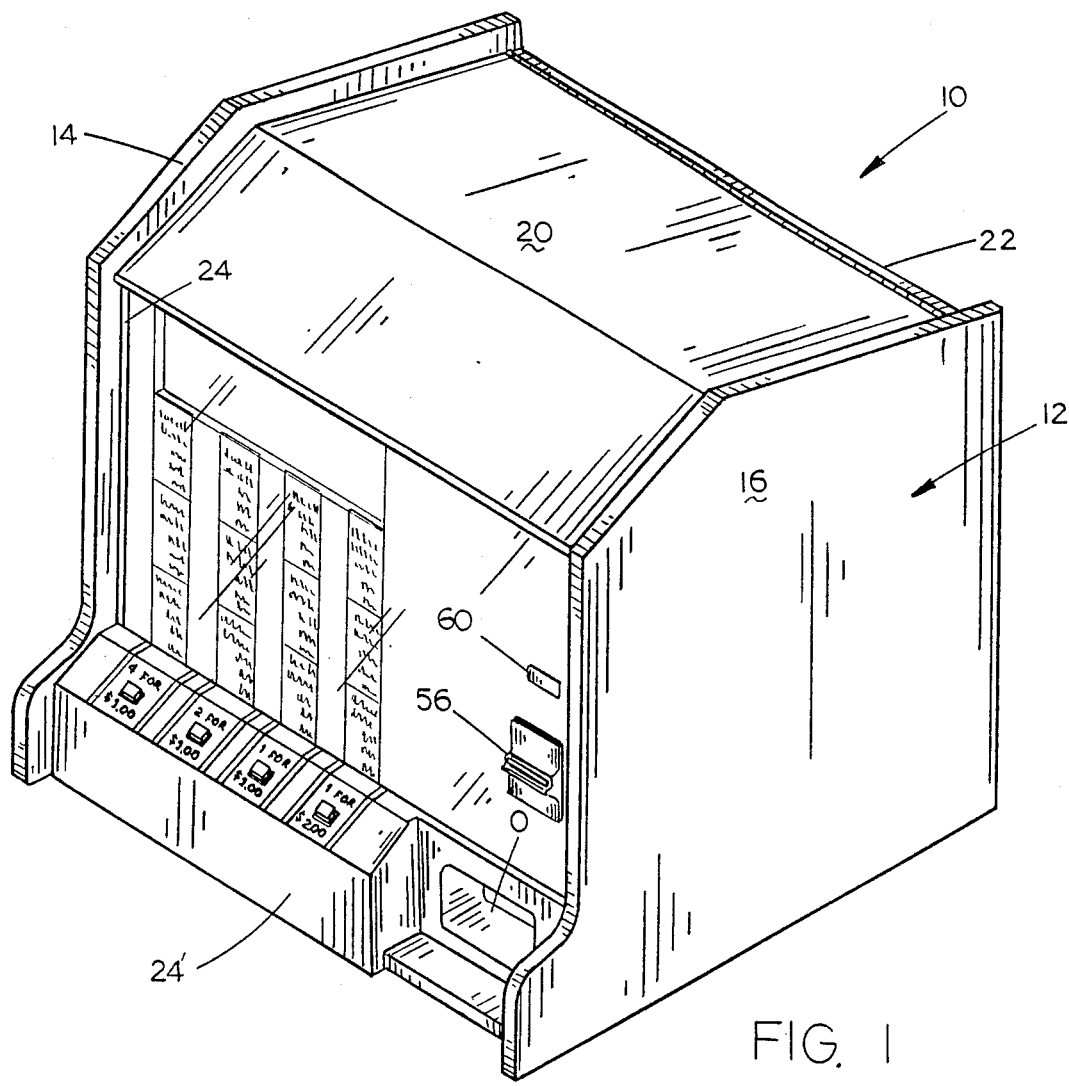
FIG. 1 is a perspective view of the dispenser of this invention.
Figure 2:
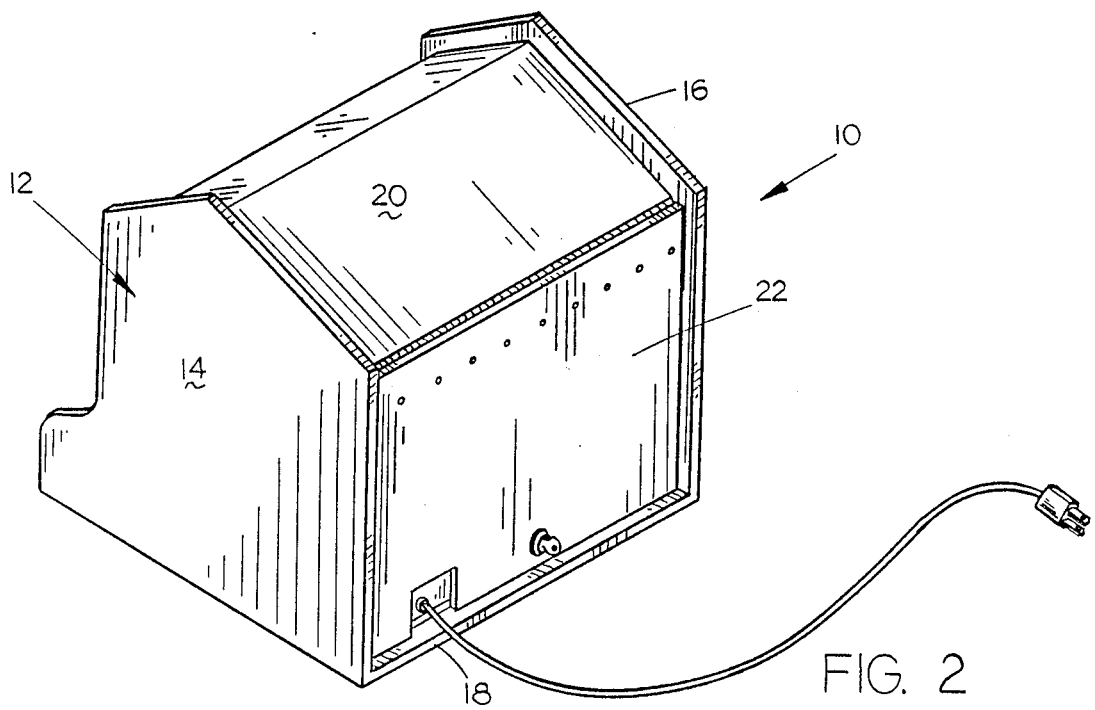
FIG. 2 is a rear perspective view of the dispenser of this invention.
Figure 3:
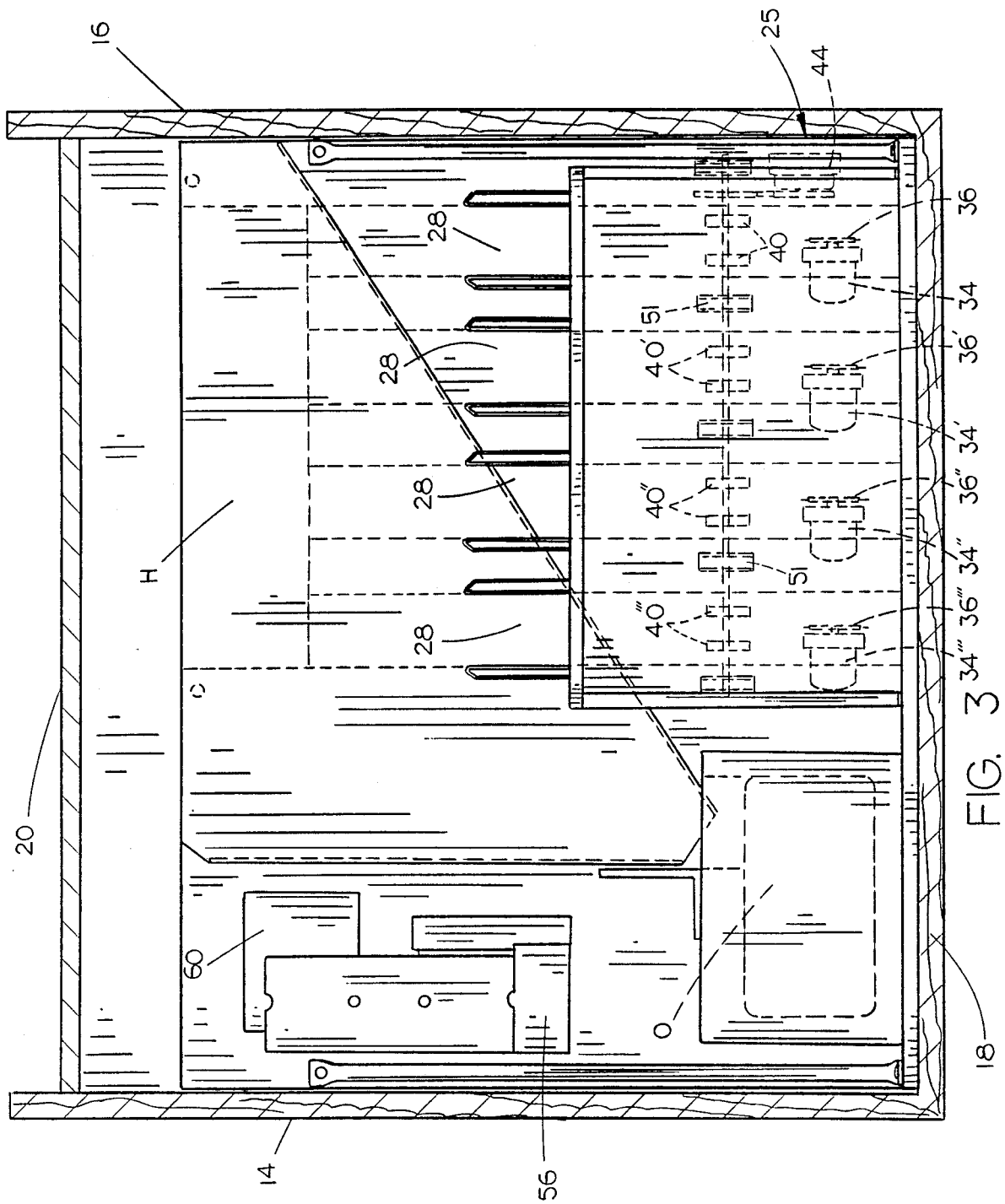
FIG. 3 is a rear view of the dispenser with the back portion thereof removed to more fully illustrate the invention.
Figure 4:
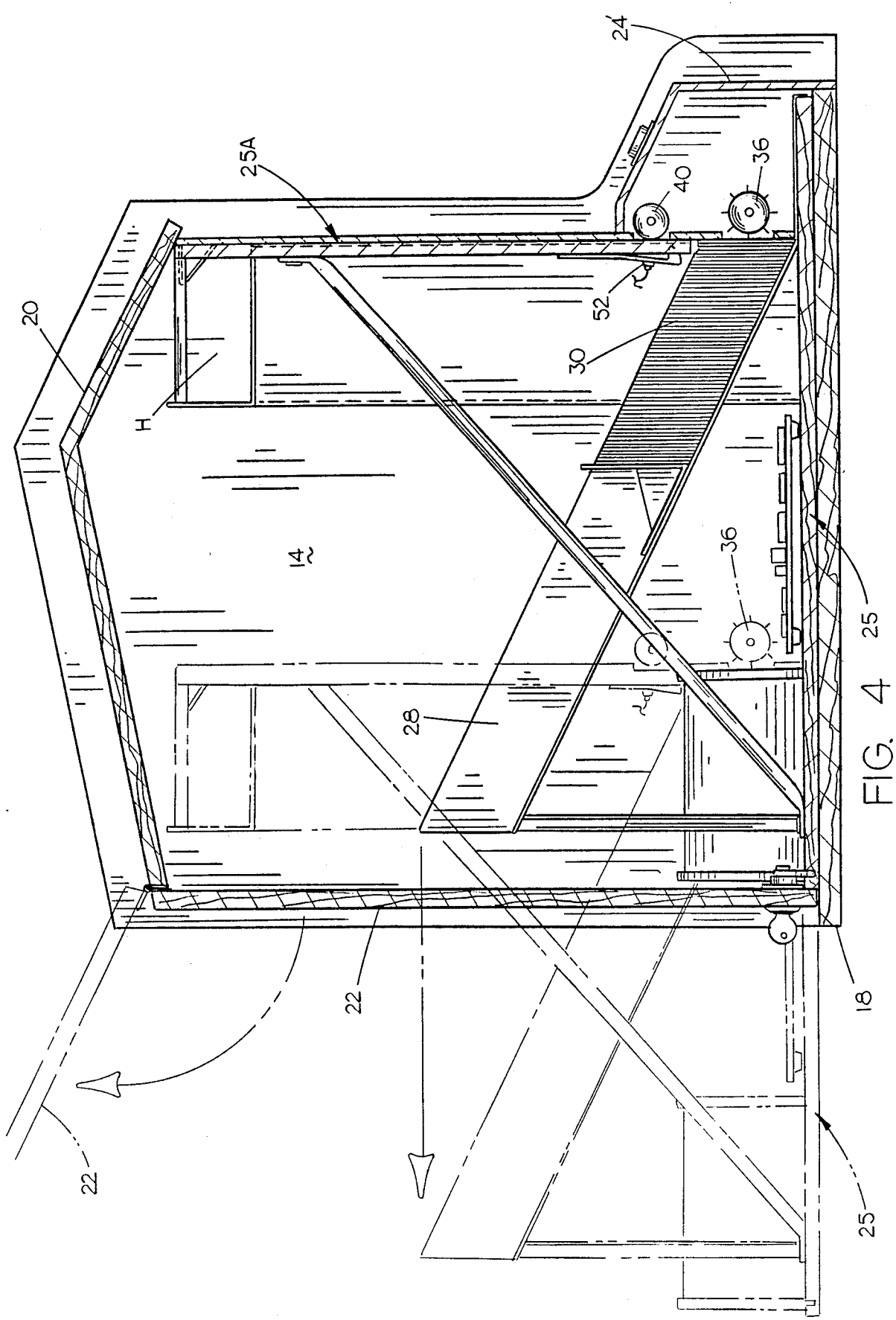
FIG. 4 is a sectional view of the dispenser of this invention.

The pickle dispensing machine of this invention includes a cabinet means having a front portion which is adapted to display the pickle cards in a vertically disposed manner. A plurality of card trays or hoppers are provided in the cabinet means and preferably contain pickles of various denominations. The front portion of the cabinet means has a plurality of vertically disposed channels formed therein which have upper and lower ends and which are adapted to receive the pickles therein. The lower end of each of the channels are in communication with one of the card hoppers so that cards may be supplied to the lower end of the channels. A bill deposit sensing means or bill acceptor is provided for sensing the deposit of one or more bills of various denominations which are recorded in a credit register means to electronically register a credit corresponding to the amount deposited in the bill deposit sensing means. An electromechanical vending apparatus is provided in the cabinet means and is operatively connected to the credit register for vending one or more cards from one or more of the card hoppers. The card vending means comprises an electrically operated drive motor which is positioned adjacent each of the channels at the lower end thereof with each of the drive motors having a rotatable card engaging wheel provided thereon which engages the forwardmost card in the associated card hopper and to move the same upwardly within the associated channel towards a card sensing means. A card sensing means is associated with each of the channels for sensing the presence of a card at a particular location within the channel to enable the credit register to down count as the cards are being dispensed. A rotatable card dispenser is positioned above the drive motors and is in engagement with the cards in the channels which have been moved upwardly therein by the card engaging wheel on the drive motors. A player inserts the money into the bill deposit sensing means and then selects the desired amount and denominations of the cards to be dispensed. In response to such selection, the cards are selectively dispensed from the channels into a tray provided at the forward portion of the apparatus.

DESCRIPTION OF THE PREFERRED EMBODIMENT

The card dispenser of this invention is referred to generally by the reference numeral 10 and includes a cabinet 12 having sides 14 and 16, bottom 18, top 20, hinged back 22 and an open front portion 24 and a lower front portion 24'.

The numeral 25 refers to a support means which is selectively slidably mounted within the cabinet 12 including an upstanding portion 25A which is adapted to close the open front portion 24 of cabinet 12. Upstanding portion 25A is provided with a transparent portion 25B to permit the player to see the cards being dispensed as will be described in more detail hereinafter.

Figure 5:
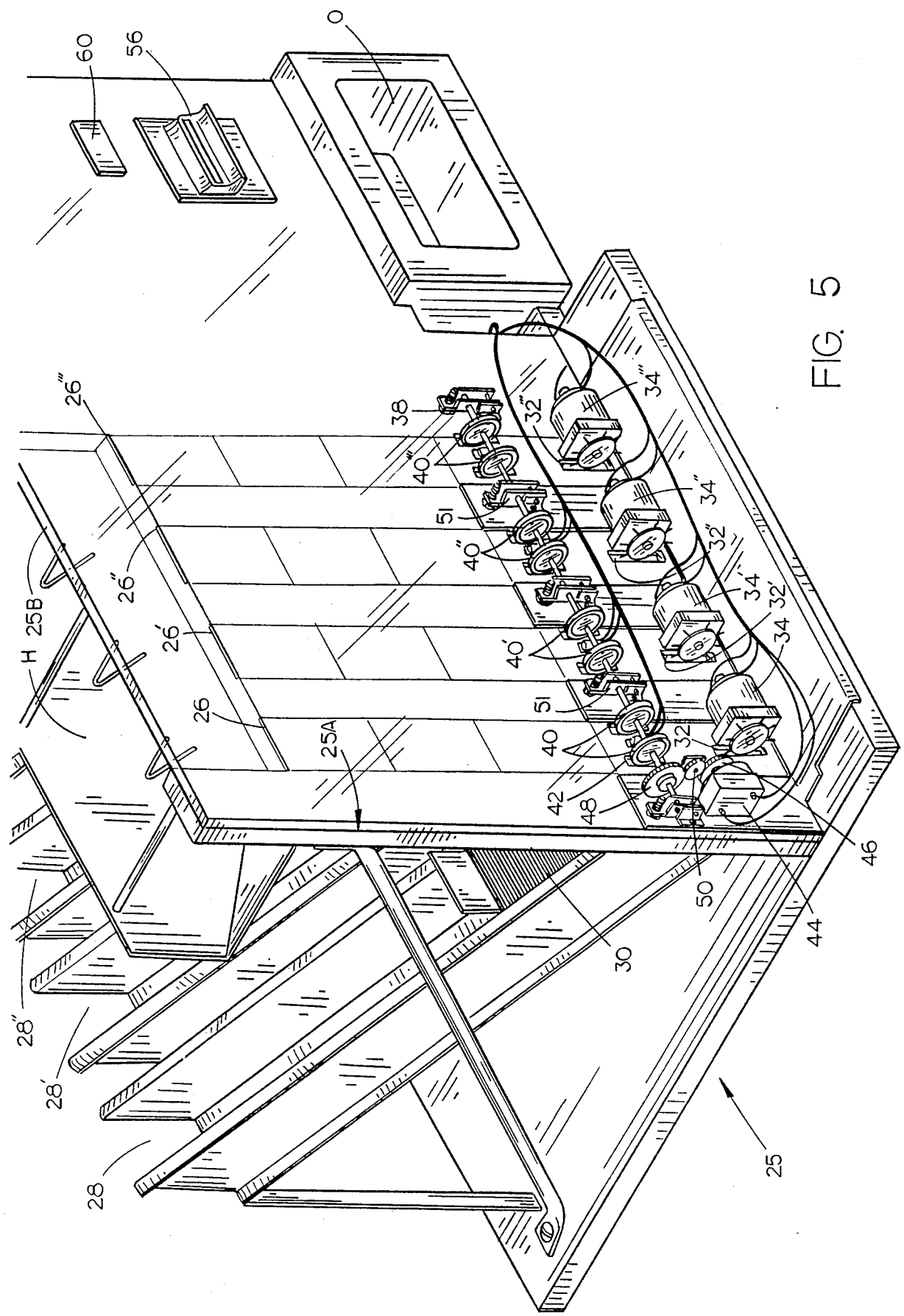
FIG. 5 is a front perspective view of the invention with the cabinet removed therefrom.
Figure 6:
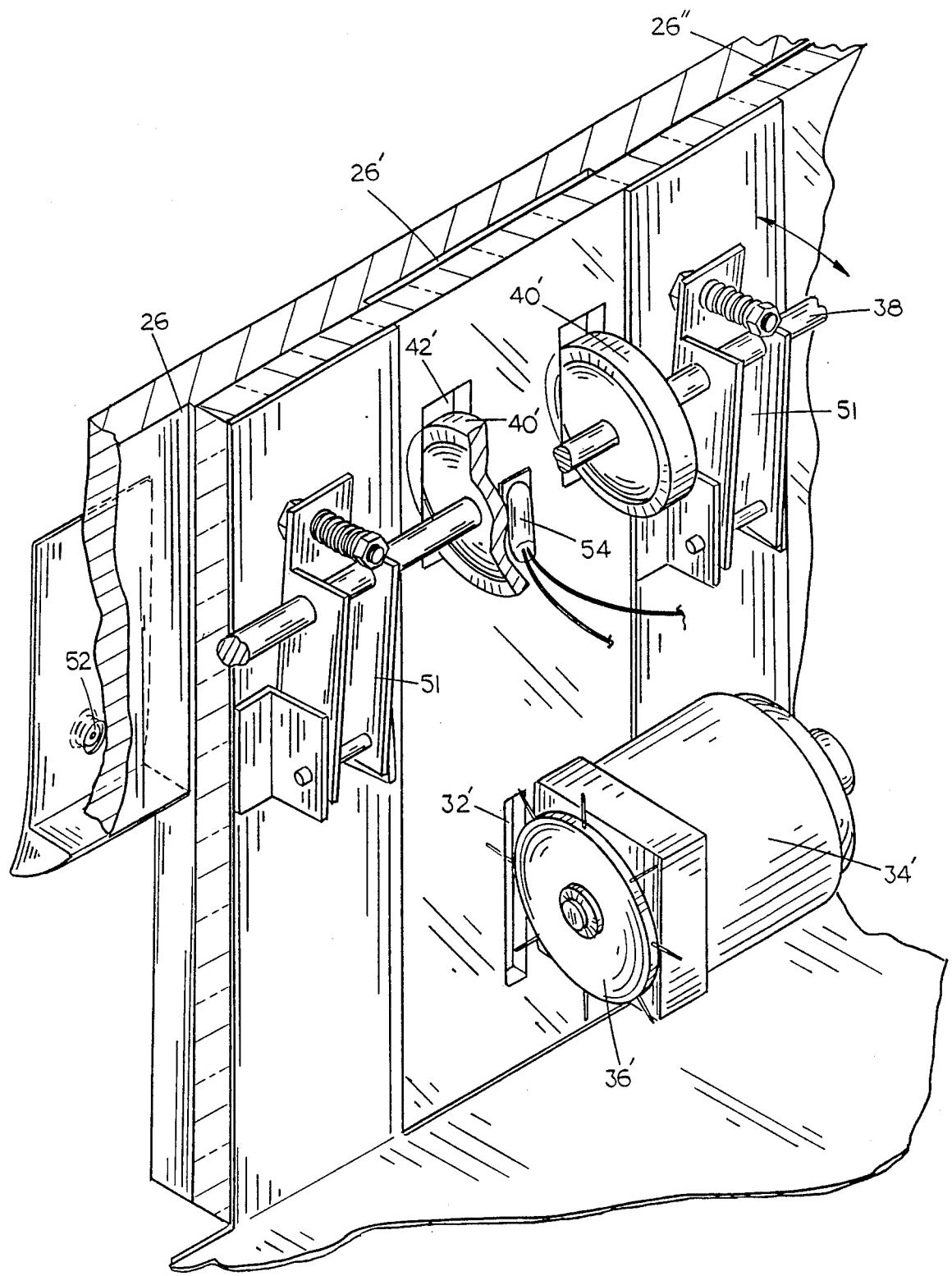
FIG. 6 is a partial front perspective view illustrating one of the drive motors and a portion of the dispensing mechanism.
Figure 8:
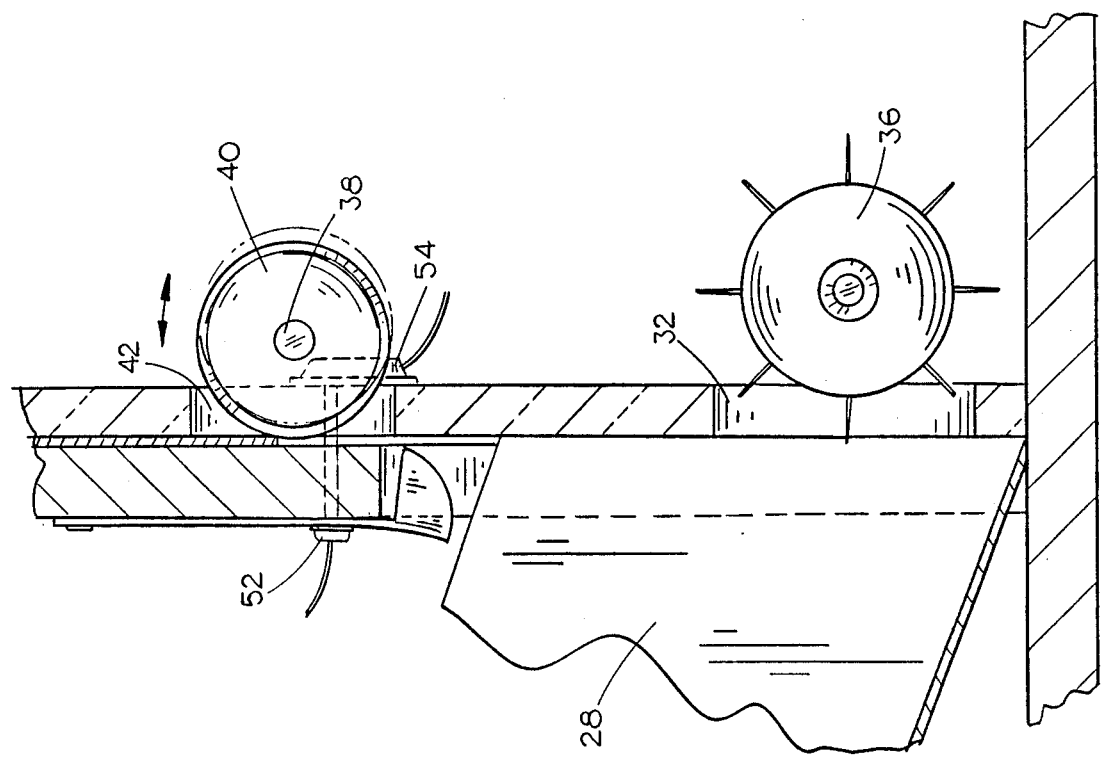
FIG. 8 is a view similar to FIG. 7 but which illustrates a card having been raised upwardly from the position of FIG. 7.
Figure 7:
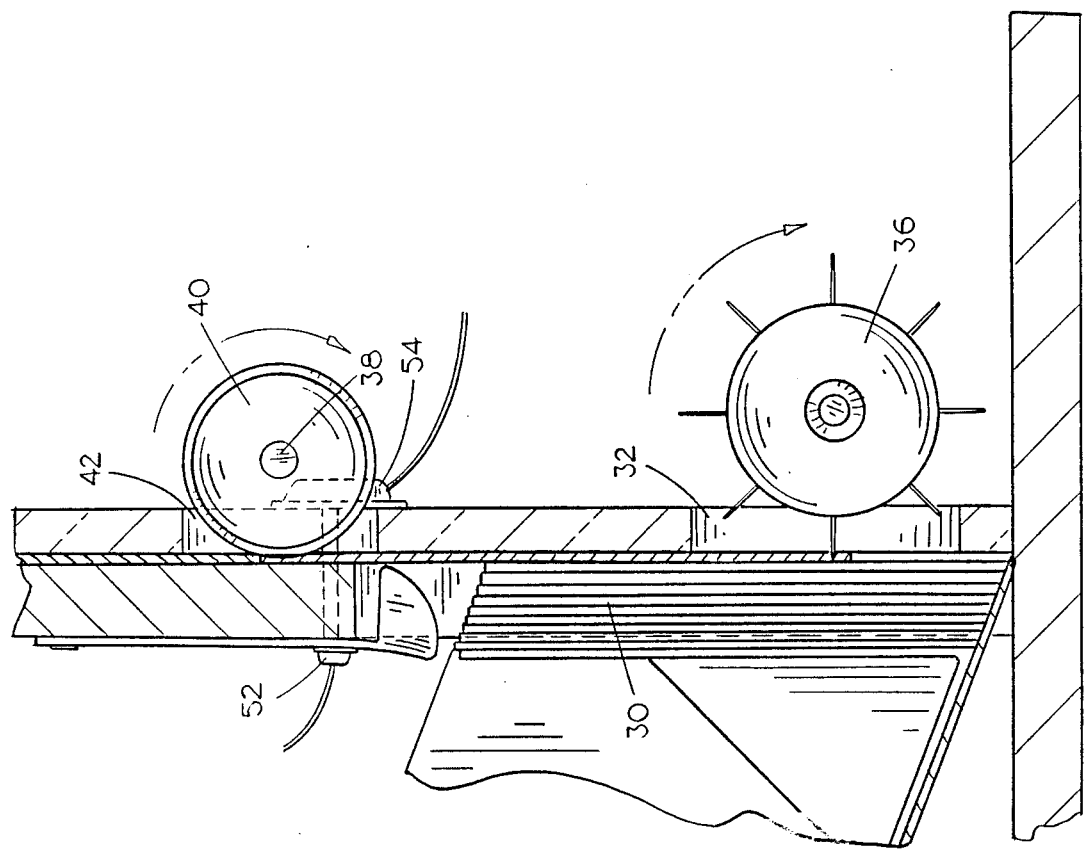
FIG. 7 is a sectional view as seen from the left of FIG. 6.

Upstanding portion 25A is provided with a plurality of spaced-apart and vertically disposed rectangular channels 26, 26', 26" and 26''' formed therein. Positioned rearwardly of upstanding portion 25A is a plurality of inclined card hoppers or trays 28, 28, 28' and 28" and 28''', the lower forward ends of which communicate with the lower ends of channels 26, 26', 26" and 26''', respectively. Hoppers 28-28''' are adapted to receive a plurality of the cards 30, 30', 30" and 30''', respectively, as seen in the drawings, in such a manner so that the cards are gravity-fed towards the front of the apparatus. The lower end of upstanding portion 25A is provided with a plurality of elongated slots 32, 32', 32" and 32''', which are positioned forwardly of the forward ends of the hoppers 28-28''', respectively, as seen in FIG. 5. A plurality of feed motors 34, 34', 34" and 34'" are mounted on upstanding portion 25A and have rotatable, spiked tooth wheels 36, 36', 36", and 36'" mounted thereon respectively, which extend through the slots 32-32'" for engagement with the lowermost card in the associated channel (the forwardmost card in the associated hopper).

Positioned above motors 34-34'" is a rotatable shaft having pairs of drive wheels 40, 40', 40" and 40'" mounted thereon for rotation therewith, with a portion of the drive wheels 40-40'" extending through slots 42, 42', 42" and 42'" formed in portion 25A for engagement with the cards as seen in the drawings.

Shaft 38 is powered by electric motor 44 having gear 46 in engagement with gear 48 on shaft 38 through gear 50. Shaft 38 is rotatably mounted on a plurality of spaced supports 51 which are pivotally mounted on upstanding portion 25A to permit the wheels 40-40'" to selectively move outwardly away from the cards but which will cause the wheels 40-40'" to frictionally engage the cards 30 to move the cards upwardly in their respective channels.

Light emitting diodes, of the infrared type, 52, 52', 52" and 52'" are positioned on upstanding portion 25A so as to direct light forwardly through the channels 26, 26', 26" and 26'" respectively towards infrared sensors 54, 54', 54" and 54'", respectively.

Figure 11:
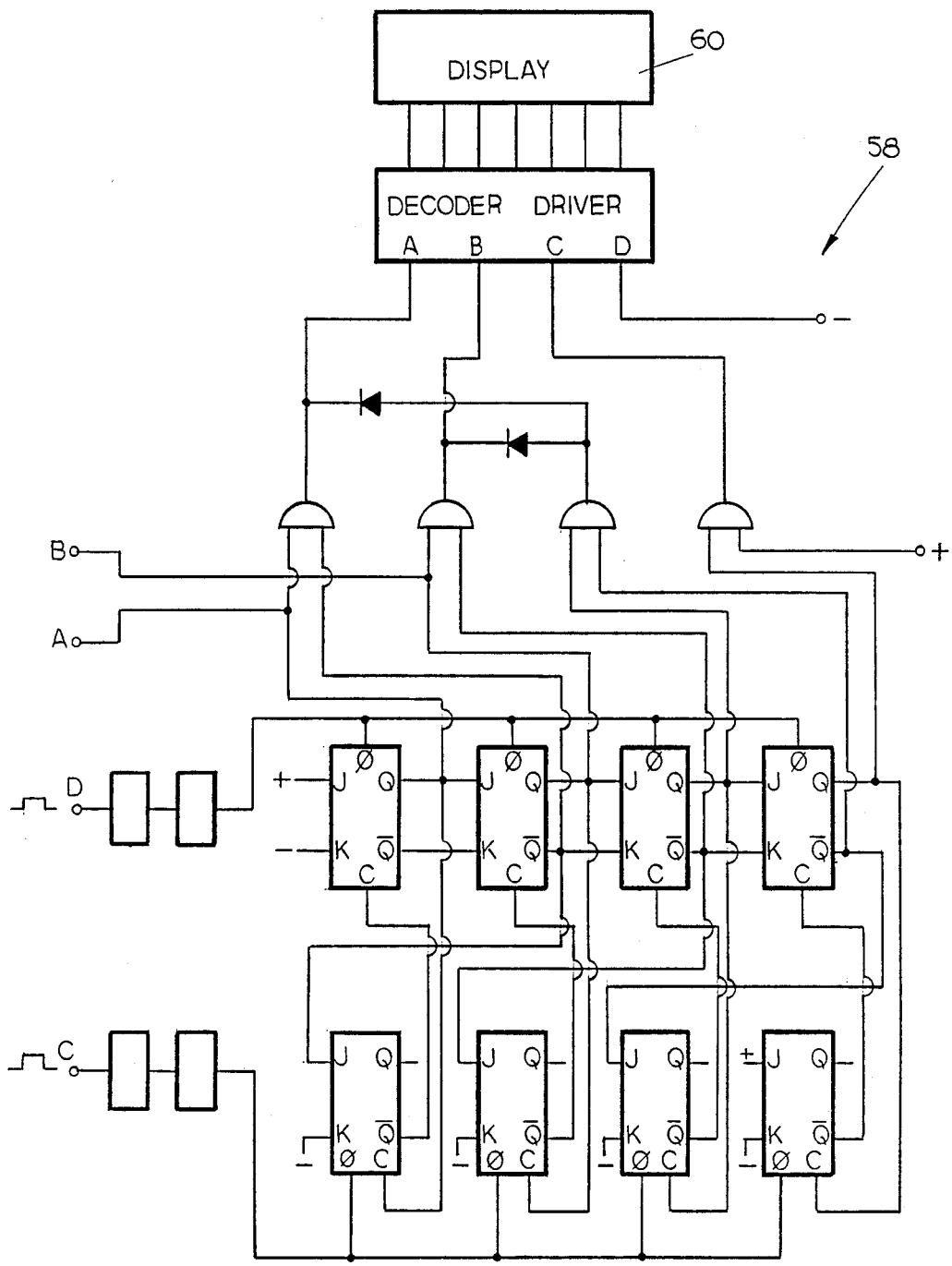

When a bill is inserted in the bill acceptor 56, pulses are generated equalling the amount of the bill. For example, if one dollar is inserted, one pulse will be generated, or if a $20 bill is inserted, twenty pulses will be generated. The pulses are stored in the credit register which is illustrated in FIG. 11 and referred to generally by the reference numeral 58 (FIG. 11). The pulses stored in the credit register 58 consists of a series of flip-flops arranged to count up or down. Terminal D (FIG. 11) is connected to the bill acceptor (up count) and terminal C (FIG. 11) is connected to the card counting I.C.'s for each row or channel (down count). Credit is displayed in a dollar amount on a four-digit L.E.D. display 60.

Figure 9:
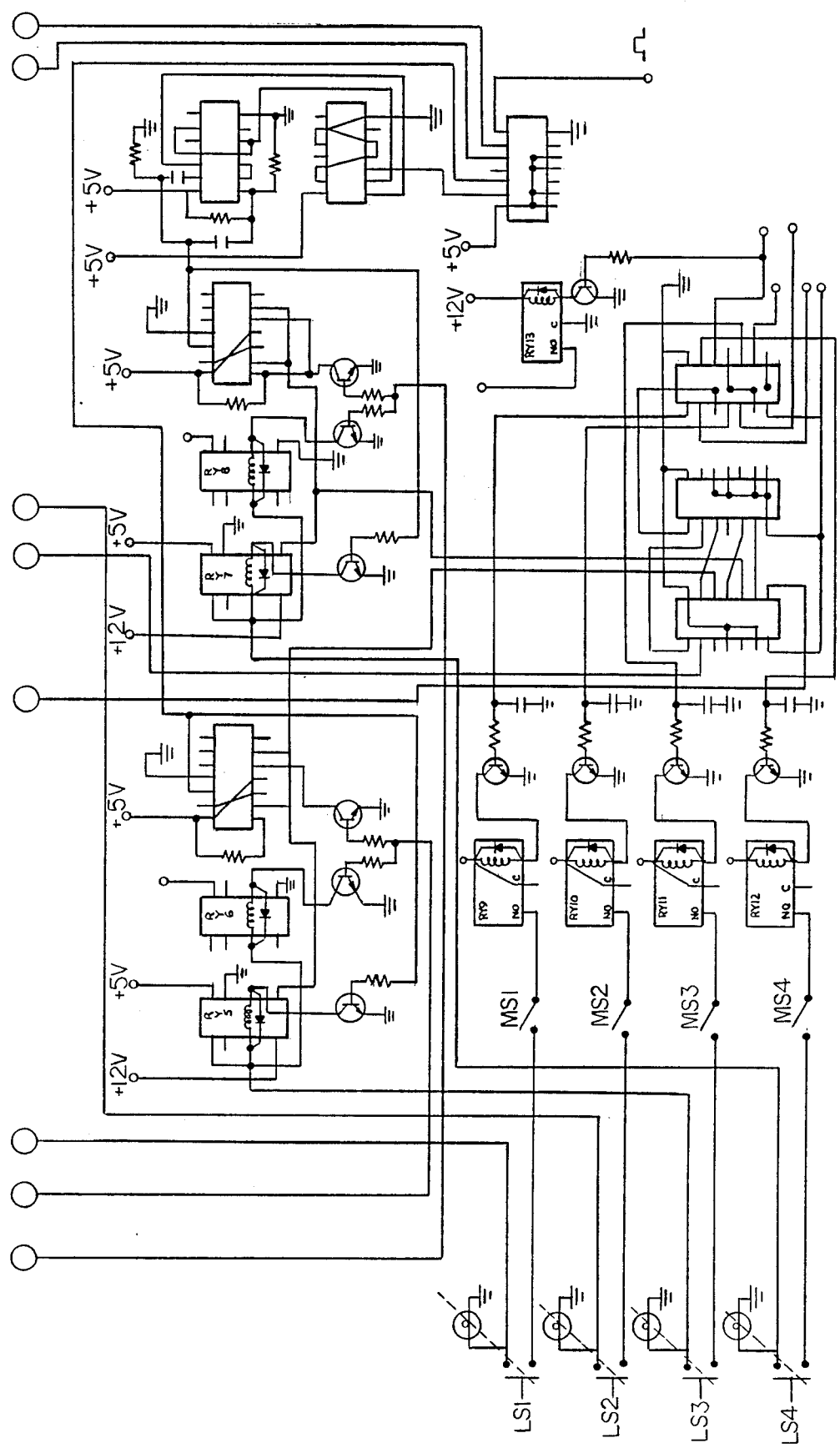
FIGS. 9-11 are schematics of a portion of the circuitry of this invention.

Whenever one pulse ($1) is stored in the credit register 58, terminal A (FIG. 11) goes high (+5 V) and energizes relay RY13 (FIG. 9) which actuates the main drive motor 44 (FIG. 5). Terminal A also energizes relays RY9, RY10, and RY11 (FIG. 9) which supplies a 12-volt current to lighted switches LSI, LS2 and LS3. When two pulses ($2) are stored in the credit register 58, terminal B (FIG. 11) goes high and energizes relay RY12 (FIG. 9) which supplies 12-volt power to lighted switches LS4.

Pressing LS1 (FIG. 9) energizes relay RY1 (FIG. 10) and latches it. RY1 will stay latched until the appropriate number of cards are dispensed to equal $1 (one pulse). When RY1 latches, it also releases relays RY9 through RY12 (through a series and gates) which disables switches LS1 through LS4, which prevents two switches from being pushed or depressed at the same time.

RY1, when latched, supplies 12-volt power to RY2 which is the control relay for feed motor 34. Feed motor 34 starts and pushes one card up until the card interrupts the light between LED 52 and infrared sensor 54. When light is interrupted, switching transistor 2—2 no longer conducts and feed motor relay RY2 is de-energized and motor 34 stops. Main drive wheel 40 (FIG. 5) then pulls the card up until the light is no longer interrupted and the sequence starts again.

Figure 10:
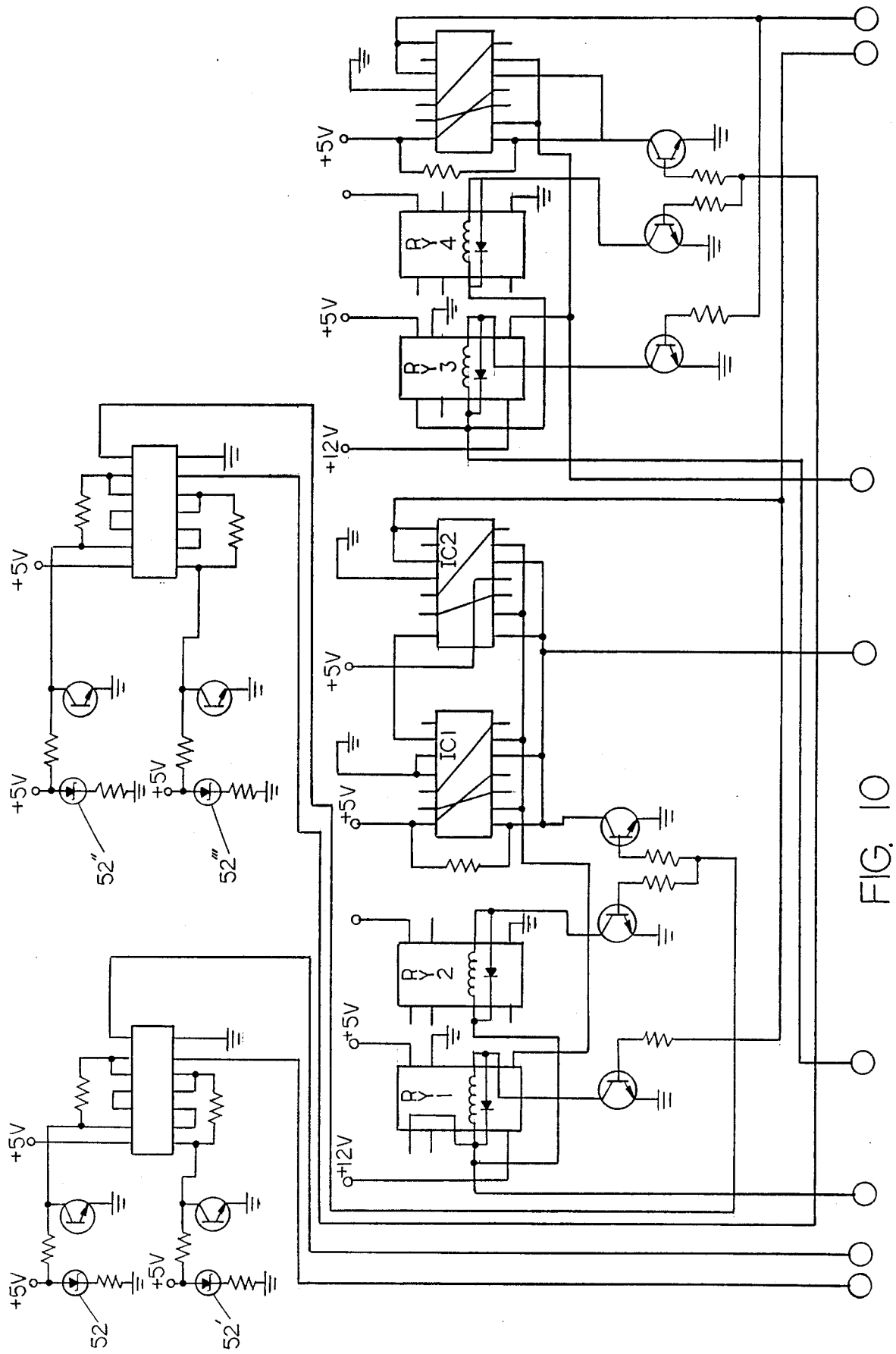

Interruption of the infrared light also supplies pulses to the card counting flip-flops IC1 and IC2 (FIG. 10). These IC's count the number of cards dispensed and generate a pulse when the correct amount of cards have been dispensed to equal $1. For example, four $0.25 cards equal one pulse. When the final card is dispensed to equal $1, the pulse generated is sent to the down count of the credit register, terminal C (FIG. 11) which subtracts $1 credit. This pulse also unlatches RY1 (FIG. 10) which clears IC's 1 and 2 and allows relays RY9 through RY12 to close again and enables switches LS1-LS4.

All the rows of cards operate the same, except Row 4 (channel 26'") in which the counting IC's supply two pulses to the down count of the credit register to subtract $2 from credit.

The cards move upwardly in their respective rows or channels and fall into the hopper H and are supplied to the patron through the opening O.

Thus it can be seen that a novel card dispensing machine has been provided which eliminates the need for an attendant manually dispensing the cards.

Further it can be seen that the card dispenser of this invention enables bills of various denominations to be inserted thereinto with a corresponding credit being displayed so that the patron can select a variety of different type or priced cards.

It can therefore be seen that the invention accomplishes at least all of its stated objectives.

We claim:
1. A card vending machine, comprising,
a cabinet means having a front portion,
a plurality of elongated card hoppers in said cabinet means for temporarily holding a plurality of cards therein, said front portion of said cabinet means having a plurality of horizontally spaced-apart and upstanding channels formed therein which have upper and lower ends,
the lower end of each of said channels being in communication with one end of one of said card hoppers whereby cards will be supplied to said channels,
a bill acceptor sensing means in said cabinet means for accepting and sensing the deposit of one or more bills of various denominations,
a credit register means in said cabinet means operatively connected to said bill acceptor sensing means for electronically registering a credit corresponding to the amount deposited in said bill acceptor sensing means,
a card dispensing means in said cabinet means operatively connected to said credit register means for dispensing one or more cards from one or more of said card hoppers,
said card dispensing means comprising:
an electrically operated drive motor positioned adjacent each of said channels adjacent the lower end thereof; each of said drive motors having a rotatable card engaging wheel means provided thereon for engaging the forwardmost card in the associated hopper and to move the same upwardly in the associated channel; a card sensing means associated with each of said channels for sensing the presence of a card at a particular location within said channel; a rotatable card engaging means positioned above said drive motors adapted to engage the cards in said channels which have been moved upwardly therein by the card engaging wheel means on said drive motors, said cabinet means having a card discharge opening formed therein, a collection chamber in said cabinet means in communication with the upper ends of said channels for receiving the cards being discharged therefrom, said collection chamber being in communication with said card discharge opening so that cards discharged into said collection chamber will be supplied to said discharge opening, and selectively operable control means for actuating said dispensing means whereby said one or more of said drive motors will be selectively actuated to move a predetermined number of cards, as sensed by said card sensing means, upwardly in the associated channel for discharge into said collection chamber, said credit register means limiting the number of cards which will be discharged into said collection chamber.

2. The apparatus of claim 1 wherein the drive motor for a particular channel is only actuated until said card sensing means senses the presence of a card passing thereby.

3. The apparats of claim 2 wherein card sensing means in operatively connected to said credit register for causing said credit register to down count as a card passes by said sensing means.

* * * * *